C. T. GILLENWATER AND J. L. PEDIGO.
TROLLEY HARP AND TROLLEY HEAD THEREFOR.
APPLICATION FILED APR. 7, 1920.
1,376,688.
Patented May 3, 1921.
2 SHEETS—SHEET 1.
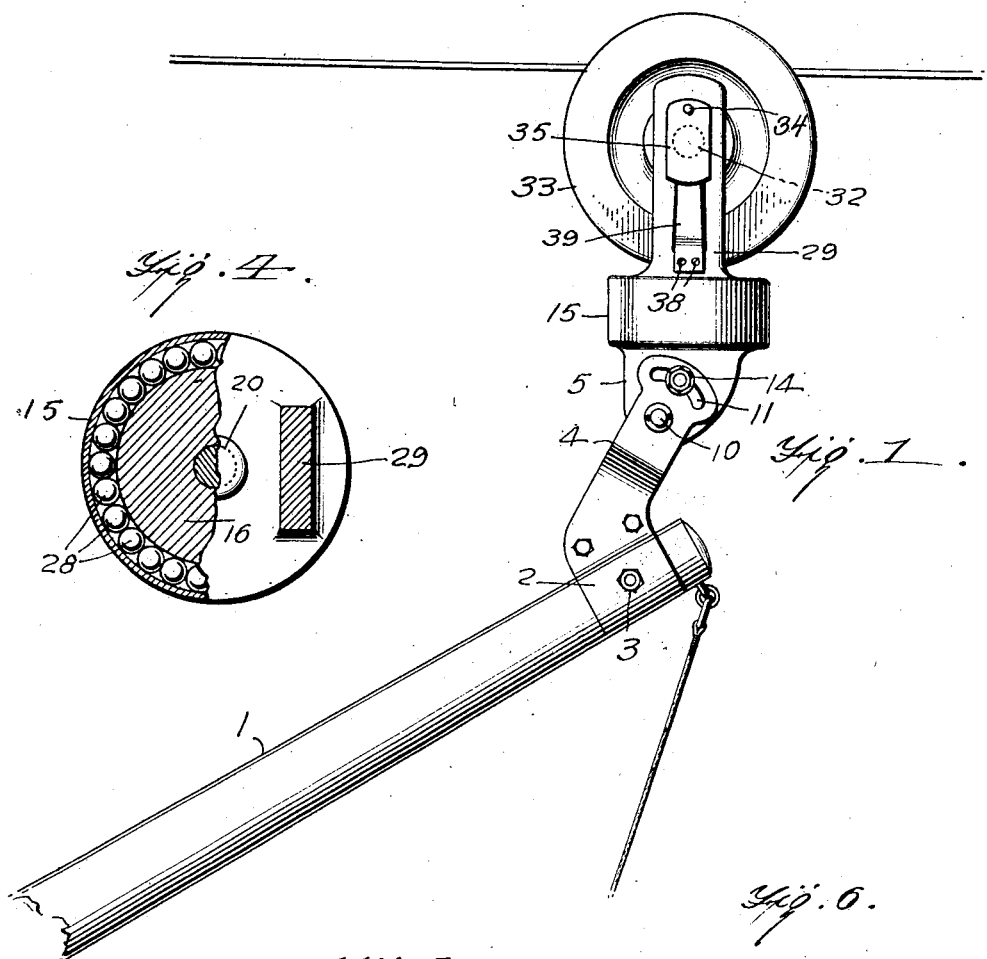
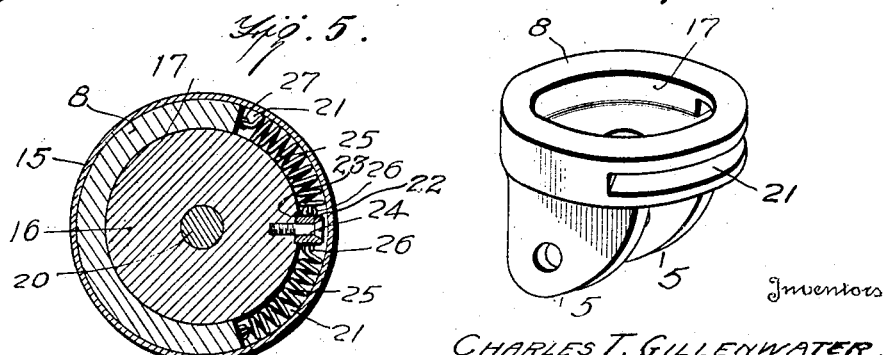
Inventors
CHARLES T. GILLENWATER.
JOHN L. PEDIGO.
By Watson E. Coleman
Attorney

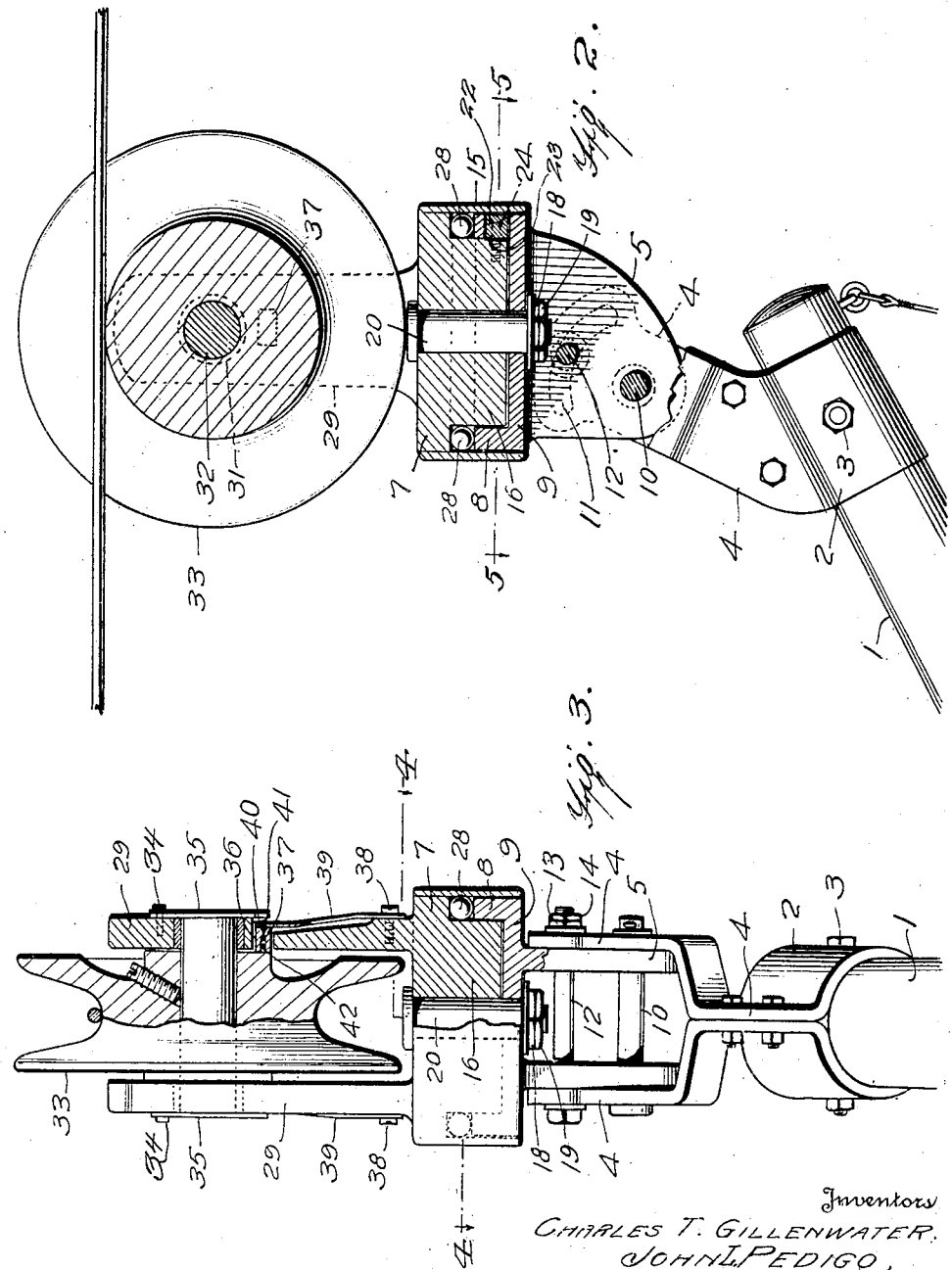

UNITED STATES PATENT OFFICE.

CHARLES T. GILLENWATER AND JOHN L. PEDIGO, OF BLUEFIELD, WEST VIRGINIA.

TROLLEY-HARP AND TROLLEY-HEAD THEREFOR.

1,376,688.   Specification of Letters Patent.   Patented May 3, 1921.

Application filed April 7, 1920. Serial No. 372,012.

*To all whom it may concern:*

Be it known that we, CHARLES T. GILLENWATER and JOHN L. PEDIGO, citizens of the United States, residing at Bluefield, in the county of Mercer and State of West Virginia, have invented certain new and useful Improvements in Trolley-Harps and Trolley-Heads Therefor, of which the following is a specification, reference being had to the accompanying drawings.

This invention relates to an improved trolley harp and trolley head therefor, and an object is to provide a device, wherein means is provided for maintaining the trolley wheel in accurate alinement with the trolley wire, in order to maintain the wheel in engagement with the wire at all times.

Another object is the provision of means for permitting the trolley head to be adjusted relatively to the trolley pole so as to accommodate the trolley head for trolley poles of different lengths. In other words, to so adjust the head so as to permit the head and wheel to occupy the space between the end of the pole and the wire, in order to keep the wheel at all times bearing upon the trolley wire.

Still another object is the provision of means for holding the trolley wheel between the forks of the harp, and also the provision of means for insuring electrical connections between the harp and the trolley wheel, in order to prevent any break in the circuit.

A further object involves the provision of a trolley head including anti-frictional bearings between the two parts of the head so as to permit one part of the head to freely move, whereby the trolley wheel may accommodate itself to the various irregularities of the trolley wire, particularly in taking curves, and passing over the hangers.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of the improved trolley harp and head therefor constructed in accordance with the invention.

Fig. 2 is a vertical sectional view through the same,

Fig. 3 is a view in front elevation of the trolley harp and head therefor showing a part of one of the forks of the harp in section, Fig. 4 is a transverse sectional view on line 4—4 of Fig. 3, Fig. 5 is a transverse sectional view on line 5—5 of Fig. 2; and Fig. 6 is a detail view in perspective of the base section of the trolley head.

Referring more especially to the drawings, 1 designates a conventional form of trolley pole and 2 denotes a metallic cuff or sleeve which is secured to the pole by means of the bolts 3. This sleeve or cuff is provided with projecting arms 4, which extend upwardly and in parallelism, and 5 denotes a trolley head. This trolley head comprises a base section 6 and a partially rotatable section 7. The base section immediately below its circular part 8 has a contracted depending part 9, which engages between the upstanding arms 4 of the clamping sleeve or cuff 2. A suitable pivoted coupling bolt 10 passes through the arms 4 and through the contracted depending part 9 of the base section of the trolley head, thereby pivotally supporting the trolley head, particularly the base section. The arms 4 are provided with opposite arcuate slots 11 whose radius extends from the center of the main coupling bolt or pivot 10. Passing through the slots 11 and engaging through the contracted depending part 9 is a holding bolt 12 having a clamping nut 13 and a lock nut 14 on one end. It will be noted that by loosening the nuts 13 and 14, the base section may be adjusted in different positions so as to adjust the head relatively to the arms 4 whereby the head and wheel may be adjusted relatively to the trolley wire, in case the trolley pole varies in length. In other words, when trolley poles vary in length, and when the space between the end of the trolley pole and the trolley wire varies, the trolley head can be adjusted to take up this space and to adapt the head for use in connection with trolley poles of different lengths.

The upper section 7 of the trolley head has a depending annular flange 15 which telescopes over the circular part 8 of the base section, thereby maintaining the two sections of the trolley head axially concentric. The section 7 of the trolley head is also provided with a central depending circular portion 16, which telescopes into a correspondingly shaped hollow or depression 17 of the circular part of the base section to further assist in holding the two sections of the trolley head axially concentric.

The contracted depending part 9 of the base section which is under the circular part 8 is cut away in order to permit the nut 18 and the lock 19 to be threaded to the lower end of the coupling king bolt 20, which passes axially through the two sections of the head, thereby pivotally coupling the two sections, whereby the upper section 7 is capable of partial revoluble movements with relation to the base section.

The circular part of the base section has a segmental slot 21 and engaging the same is a boss 22. This boss 22 engages a depression 23 in the surface of the circular depending portion 16 of the upper section 7 and owing to the boss 22 being rectangular, turning of the same is prevented. A holding screw 24 passes through the boss and is threaded into the circular depending portion 16 of the section 7 so as to hold the boss connected to the depending portion 16.

Coiled tension springs 25 are provided, and have their adjacent ends connected to eyes 26 of the opposite sides of the boss 22 and their remote ends are connected to the eyes 27 of the ends of the segmental slot 21. By the provision of these tensioned coil springs, the trolley head is maintained in such position that the forks of the harp will remain in uniform positions with the trolley pole, in such wise as to permit the trolley wheel to move relatively and accommodate itself to the irregularities or short turns in the trolley wire, thereby preventing the trolley wheel from readily jumping the wire, as is the case with a great many of the trolley wheels now in use. By means of the depending flange 15, the segmental slot 21 and the tensioned coil springs 25 are protected from the weather.

In order to permit the upper section 7 of the trolley head to partially rotate freely and with a minimum amount of friction, a plurality of anti-frictional ball bearings 28 are mounted in the space between the central depending portion 16 and the flange 15. It is to be noted that these ball bearings may be easily removed, cleaned or repaired by simply detaching the king bolt and separating the two sections of the head.

Rising upwardly from the upper section 7 of the trolley head are trolley harp arms or forks 29 having bearings 30 for the reception of the bushings or sleeves 31, and revolubly mounted in the bushings or sleeves is the trolley wheel shaft or pin 32, on which a trolley wheel 33 is mounted to rotate therewith. Pivotally mounted at 34 by means of set bolts upon the outer face of the harp forks are holding plates 35 to retain the bushings or sleeves 31 in their bearings 30, and also to hold the trolley wheel pin or shaft in place. By loosening the set bolts 34, the holding plates 35 may be pivotally moved so as to extend upwardly so as to permit the removal of the wheel pin or shaft, or the removal of the bushing or sleeve. When the holding plate 35 is moved to cover the sleeves and the ends of the trolley pin or shaft, the set bolt 34 may be tightened in order to prevent accidental movement of the holding plates. Furthermore, the holding plates protect the bushings and the bearings of the trolley wheel pin or axle from the weather.

The harp forks 29 of the upper section of the trolley head are provided with rectangular guide openings 36 to receive the contact blocks 37 which may be constructed of any suitable metal, preferably copper. These contact blocks protrude through the harp forks and bear upon opposite sides of the trolley wheel 33, thereby insuring a constantly closed circuit, in other words, preventing intermittent breaking of the circuit. Secured by means of the set bolts 38 to the outer faces of the harp forks are leaf springs 39 which extend upwardly and have the contact blocks 37 secured to their upper ends as by means of the bolts 40. The heads 41 of the bolts are countersunk in the cavities 42 of the contact blocks. By means of the leaf springs carrying the contact block in this manner, the trolley wheel 33 is maintained at all times in uniform position relatively to the harp forks and relatively to the trolley wire.

From the foregoing, it will be seen that an uninterrupted circuit is maintained between the trolley wire and the source of energy and the trolley pole. Furthermore, it will be noted that by means of the tensioned coil springs, the upper section of the trolley head is maintained in relative positions to the base section so that the trolley wheel is capable of taking the various curves of the trolley wire, particularly short curves and permitting the wheel to accommodate the grooves of the wheel to the hangers during the limit of travel of the wheel relatively to the wire. Furthermore, the trolley head can be adjusted to keep the trolley wheel in firm contact with the wire.

From the foregoing it will be noted that there has been devised a very durable trolley wheel and harp and one which has been found serviceable and furthermore it will be noted that the bushings when worn out can be easily renewed or replaced, by simply swinging the cover plates 35 to one side, removing the journal pin of the wheel, which will permit of access to the bushings. The contact blocks can be replaced by removing the leaf springs, and attaching others thereto, then replacing the springs.

The invention having been set forth, what is claimed as new and useful is:

1. In a trolley harp and trolley head therefor, the combination with a trolley pole, of a trolley head comprising a base section and an upper movable section, partially rockable in a horizontal plane about a vertical axis, the base section being operatively adjustably mounted upon the pole, means for coupling the two sections concentrically together, a trolley wheel operatively mounted upon the movable section, and means connecting parts of the two sections to permit one section to move relatively to the other, whereby the wheel may accommodate itself to the irregularities of the trolley wire.

2. In a trolley harp and head therefor, the combination with a trolley pole, of a pair of upstanding parallel arms carried by the trolley pole, a trolley head operatively pivoted between said arms, means for holding the head relatively adjusted with relation to the arms, said head comprising two operatively connected sections, one movable in a horizontal plane with relation to the other, means for tensioning the movable section, whereby the trolley wheel may accommodate itself to the irregularities of the trolley wire, and a trolley wheel operatively mounted on the movable section.

3. In a trolley harp and trolley head therefor, the combination with a trolley pole, of a trolley head operatively connected to the pole for movement on a horizontal axis and in a plane with the trolley wire, said head comprising two operatively connected concentric sections, one movable in a horizontal plane about a vertical axis at right angles to the supporting axis of the head, tensioning means connecting the two sections of the head, whereby the trolley wheel may accommodate itself to the irregularities of the trolley wire, means for holding the trolley head in different positions on its horizontal axis, and a trolley wheel mounted upon the movable section of the head.

4. In a trolley harp and head therefor, a trolley head comprising two operatively connected sections, one movable in a plane relatively to the other, whereby the trolley wheel may accommodate itself to the irregularities of the trolley wire, one of the sections of the head having forks provided with bushing bearings, a trolley wheel having a shaft engaging said bushing bearings, means on the outer faces of the forks engaging the bushing bearings and the shaft to hold the parts in place, means connected to one fork and having a device protruding through the fork to contact with the wheel to maintain a constant uninterrupted circuit through the trolley wire, supporting arms on the end of the pole, means pivotally and operatively connecting the head between the arms, and means for holding the head adjustable, so that the head and the wheel may occupy a space of varying dimensions between the arms and the trolley wire, whereby different lengths of trolley poles may be used.

5. In a trolley harp and head therefor, a trolley head carrying a trolley wheel and comprising two sections, one movable in a horizontal plane relatively to the other, whereby the wheel may accommodate itself to the lateral irregularities of the trolley wire, means for yieldably centering the movable section, a trolley pole having parallel spaced arms at its upper end, means pivotally connecting the head between the arms, and means for adjustably holding the head relatively to the arms, whereby the head and wheel may be disposed to occupy a space of varying dimensions between the arms and the trolley wire, whereby trolley poles of different lengths may be used.

6. In a trolley harp and head therefor, a trolley head including a trolley wheel thereon, a trolley pole having parallel spaced arms at its upper end, means operatively and pivotally connecting the head between the arms, said arms having arcuate slots whose radii are concentric with the pivoted means between the head and the arms, means engaging through the arcuate slots and a portion of the head for holding the head adjustable relatively to the arms, whereby the head and the wheel may occupy a space of varying dimensions between the arms and the trolley wire, whereby trolley poles of different lengths may be used.

7. In a trolley harp and head therefor, a trolley pole, a trolley head operatively mounted upon the upper end of the trolley pole, said head comprising a base section having an annular marginal upstanding flange, and a movable section having an extension to rotatably engage the base section within its marginal upstanding flange, said rotatable movable section having a flange telescoping over the flange of the base section, and anti-frictional means operatively engaging between the upper edge of the first marginal flange of the base section and a portion of the movable section, the marginal upstanding flange of the base section having an arcuate slot whose radius is concentric with the center of the base section, centering tensioned springs in said slot of the flange of the base section having their adjacent ends operatively connected to the downwardly extending part of the movable section and their remote ends connected to the ends of the slot, whereby the trolley wheel may accommodate itself to the lateral irregularities of the trolley wire, and pivot pin operatively connecting the base and movable sections, and a trolley wheel mounted on the movable section.

In testimony whereof we hereunto affix our signatures.

CHARLES T. GILLENWATER.
JOHN L. PEDIGO.